United States Patent
Maccagnani et al.

(10) Patent No.: US 9,096,337 B2
(45) Date of Patent: *Aug. 4, 2015

(54) GLUING UNIT FOR APPLYING ADHESIVE TO A SUCCESSION OF OPENING DEVICES FOR GLUING TO SEALED PACKAGES OF FOOD PRODUCTS POURABLE INTO A TUBE OF PACKAGING MATERIAL

(71) Applicant: TETRA LAVAL HOLDINGS & FINANCE S.A., Pully (CH)

(72) Inventors: Andrea Maccagnani, Modena (IT); Lars Skarin, Uddevalla (SE); Lennart Johansson, Uddevalla (SE); Mahmod Tabarte, Munkedal (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,608

(22) Filed: Nov. 18, 2013

(65) Prior Publication Data

US 2014/0069329 A1 Mar. 13, 2014

Related U.S. Application Data

(63) Continuation of application No. 13/056,558, filed as application No. PCT/EP2009/063892 on Oct. 22, 2009, now Pat. No. 8,584,614.

(30) Foreign Application Priority Data

Oct. 30, 2008 (EP) .................................... 08167991

(51) Int. Cl.
*B05B 3/00* (2006.01)
*B05B 13/04* (2006.01)
(Continued)

(52) U.S. Cl.
CPC ............... *B65B 51/02* (2013.01); *B65B 61/186* (2013.01); *B65D 5/747* (2013.01); *B65B 3/025* (2013.01); *B65B 7/2871* (2013.01); *Y10T 156/1798* (2015.01)

(58) Field of Classification Search
USPC ......... 118/300, 321, 323, 313–315, 306, 317; 427/505, 516, 207.1; 493/150, 87; 156/578; 239/752
See application file for complete search history.

(56) References Cited

U.S. PATENT DOCUMENTS

| 4,990,200 | A | 2/1991 | Heinz |
| 5,316,219 | A | 5/1994 | Christyson et al. |

(Continued)

FOREIGN PATENT DOCUMENTS

| DE | 20 2006 008 051 U1 | 8/2006 |
| EP | 0 579 417 A1 | 1/1994 |

(Continued)

OTHER PUBLICATIONS

International Search Report (PCT/ISA/210) issued on Feb. 16, 2010, by European Patent Office as the International Searching Authority for International Application No. PCT/EP2009/063892.

(Continued)

*Primary Examiner* — Yewebdar Tadesse
(74) *Attorney, Agent, or Firm* — Buchanan Ingersoll & Rooney PC (57) ABSTRACT

A gluing unit for applying adhesive to a succession of opening devices to be fitted to respective sealed packages of food products pourable into a tube of packaging material, the unit having a conveyor for feeding the opening devices along a path, and an adhesive dispenser located along the path, interacting with each opening device to apply adhesive to a portion of the opening device, and movable in a plane parallel to the path as well as crosswise to the plane.

12 Claims, 8 Drawing Sheets

(51) Int. Cl.
  B05C 5/00 (2006.01)
  B65B 51/02 (2006.01)
  B65B 61/18 (2006.01)
  B65D 5/74 (2006.01)
  B65B 3/02 (2006.01)
  B65B 7/28 (2006.01)

(56) References Cited

U.S. PATENT DOCUMENTS

| | | |
|---|---|---|
| 6,024,147 A | 2/2000 | Hunter, Jr. |
| 7,516,595 B2 | 4/2009 | Dammers et al. |
| 8,584,614 B2 * | 11/2013 | MacCagnani et al. ........ 118/321 |
| 2002/0037372 A1 | 3/2002 | Sato et al. |
| 2009/0048084 A1 | 2/2009 | Morselli et al. |

FOREIGN PATENT DOCUMENTS

| | | |
|---|---|---|
| EP | 0 943 549 A1 | 9/1999 |
| EP | 1 798 149 A1 | 6/2007 |
| RU | 2322378 C2 | 4/2008 |

OTHER PUBLICATIONS

Written Opinion (PCT/ISA/237) issued on Feb. 16, 2010, by European Patent Office as the International Searching Authority for International Application No. PCT/EP2009/063892.

Russian Office Action (Decision to Grant) issued Aug. 22, 2013 by the Russian Patent Office in Russian Patent Application 2011110763 and English language translation fo Russian Office Action (11 pages).

* cited by examiner

GLUING UNIT FOR APPLYING ADHESIVE TO A SUCCESSION OF OPENING DEVICES FOR GLUING TO SEALED PACKAGES OF FOOD PRODUCTS POURABLE INTO A TUBE OF PACKAGING MATERIAL

TECHNICAL FIELD

The present invention relates to a gluing unit for applying adhesive to a succession of opening devices for gluing to sealed packages of food products pourable into a tube of packaging material.

BACKGROUND ART

As is known, many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gabletop" package known by the trade name Tetra Rex (registered trademark).

Once formed, the above packages may undergo further processing, such as applying a reclosable opening device to protect the food product inside the package from contact with external agents, and to enable the product to be poured out.

At present, the most commonly marketed opening devices comprise an annular frame defining a pour opening and fitted about a removable or pierceable portion of a top wall of the package; and a cap hinged or screwed to the frame, and which is removable to open the package.

The removable portion of the package may be defined by a sealing sheet glued or heat-sealed to the outside of the package to close a through hole in the package. One example of this solution is described and illustrated in Patent Application EP-A-9433549. Alternatively, the removable portion of the package may be defined by a so-called "prelaminated" hole, i.e. a hole formed in the base layer of the packaging material before covering the base layer with other layers defining the packaging material, e.g. the layers of thermoplastic material and/or the layer of barrier material, which close the hole hermetically.

In both cases, before being applied to the respective packages, the opening devices are fed successively through a gluing unit, in which they are coated with adhesive, usually hot-melt glue.

As described for example in Patent Application EP-A-1798149, on which the preamble of claim 1 is based, gluing units are known substantially comprising a conveyor for feeding the opening devices along a given path, and an adhesive dispenser, which interacts with each opening device to apply adhesive to a flat fastening portion of the opening device frame.

More specifically, the adhesive is applied by moving the dispenser along a flat application path parallel to the fastening portion plane.

Though reliable and efficient, the gluing units described still leave room for further improvement.

More specifically, a need is felt to apply the adhesive to the fastening portion along predetermined trajectories and in predetermined amounts as repeatably and controllably as possible.

This is particularly so in the case of opening devices comprising a frame straddling an edge between a first and second wall, e.g. the top wall and a top end portion of a lateral wall, of the package, and comprising a first and second portion at an angle to each other and glued to the first and second wall respectively by respective fastening portions inclined with respect to each other.

SUMMARY

A gluing unit is provided for applying adhesive to opening devices for gluing to sealed packages of products pourable into a tube of packaging material. A gluing unit applies adhesive to a succession of opening devices to be fitted to respective sealed packages of food products pourable into a tube of packaging material.

BRIEF DESCRIPTION OF THE DRAWINGS

A preferred, non-limiting embodiment of the present invention will be described by way of example with reference to the accompanying drawings, in which.

DETAILED DESCRIPTION

With reference to FIGS. 1 to 4, number 1 indicates as a whole a gluing unit, in accordance with the present invention, which can be incorporated in a known food product packaging machine (not shown) of the type described in the introduction, to apply adhesive—in the example shown, hot-melt glue—to a succession of reclosable plastic opening devices 3 for gluing to packages filled, sealed, and formed on the machine.

Very briefly, a continuous tube is formed on the packaging machine from the web-fed packaging material. More specifically, the web of packaging material is first sterilized on the packaging machine with a sterilizing agent that is subsequently removed; and the web of packaging material so sterilized is maintained in a closed, sterile environment, and is folded and sealed longitudinally to form a vertical tube of packaging material.

The tube of packaging material is filled with the sterilized or sterile-processed food product, and is sealed and subsequently cut along equally spaced cross sections to form pillow packs, which are then folded mechanically to form respective finished packages.

The machine preferably produces sealed packages of a pourable food product, such as pasteurized or UHT milk, fruit juice, wine, etc.

The packaging machine may also produce sealed packages of a food product which is pourable into the tube of packaging material when producing the packages, and sets after the packages are sealed. One example of such a food product is a portion of cheese, which is melted when producing the packages, and sets after the packages are sealed.

Non-limiting examples of packages produced on packaging machines of the type referred to above are the parallelepiped-shaped packages known by the trade name Tetra Brik Aseptic (registered trademark) or so-called "gable-top" packages known by the trade name Tetra Rex (registered trademark).

The packaging material has a multilayer structure substantially comprising a base layer for stiffness and strength, which may comprise a layer of fibrous material, e.g. paper, or of mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH), which is superimposed on a layer of heat-seal plastic material, and is in turn covered with another layer of heat-seal plastic material forming the inner face of the package eventually contacting the food product.

Opening device 3 is applied to a removable portion of a respective package (shown by the dash line in FIG. 9), i.e. a portion detachable from the rest of the package to pour out the pourable product.

The removable portion may be defined by a sealing sheet glued or heat-sealed to the package to close a through hole in the package. Alternatively, the removable portion may be defined by a so-called "prelaminated" hole, i.e. a hole formed in the base layer of the packaging material and closed hermetically by other layers (at least the layers of thermoplastic material) of the packaging material.

Figure 1:
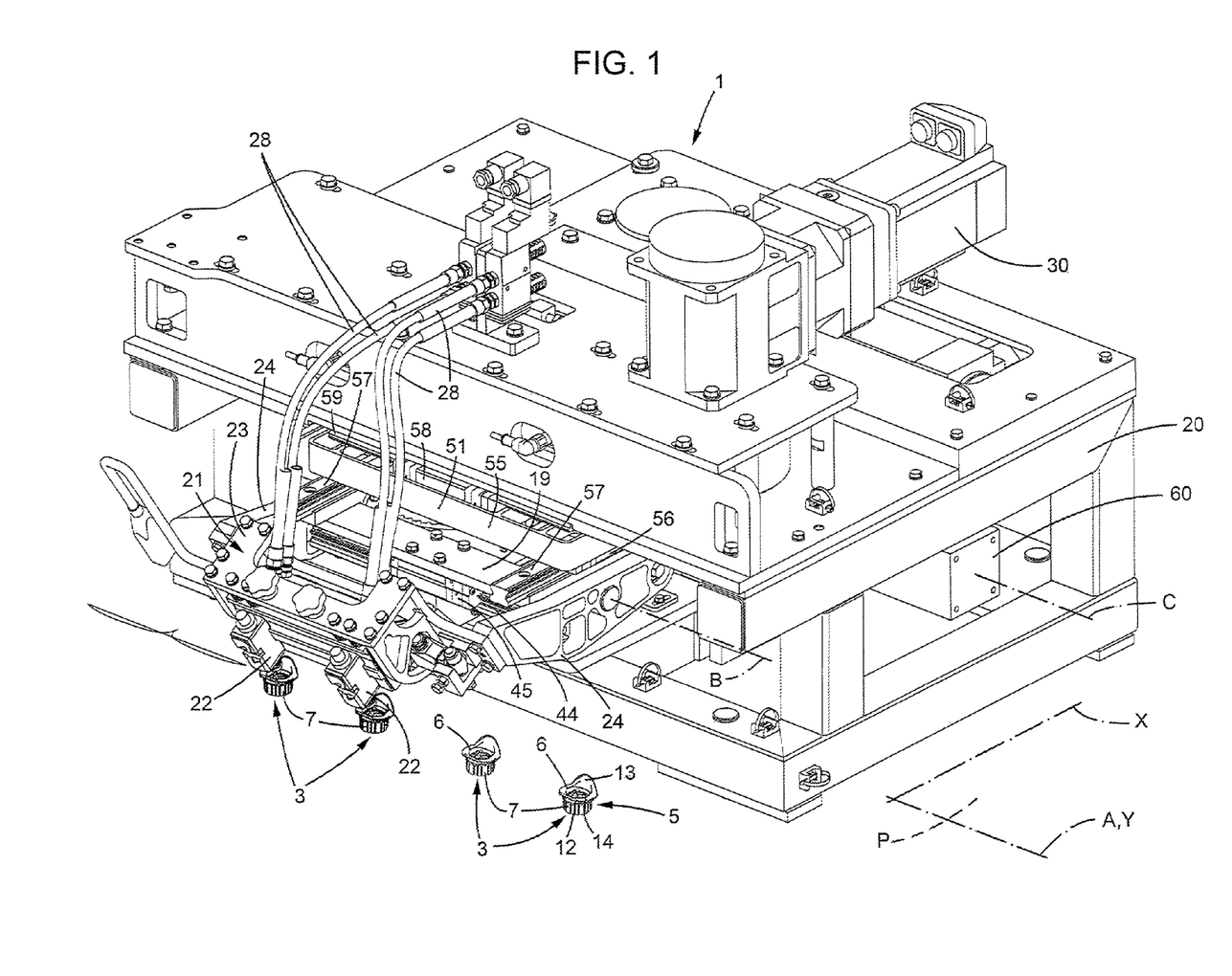
FIG. 1 shows a top view in perspective of a gluing unit, in accordance with the present invention, for applying adhesive to a succession of opening devices for gluing to sealed packages of food products pourable into a tube of packaging material.
Figure 2:
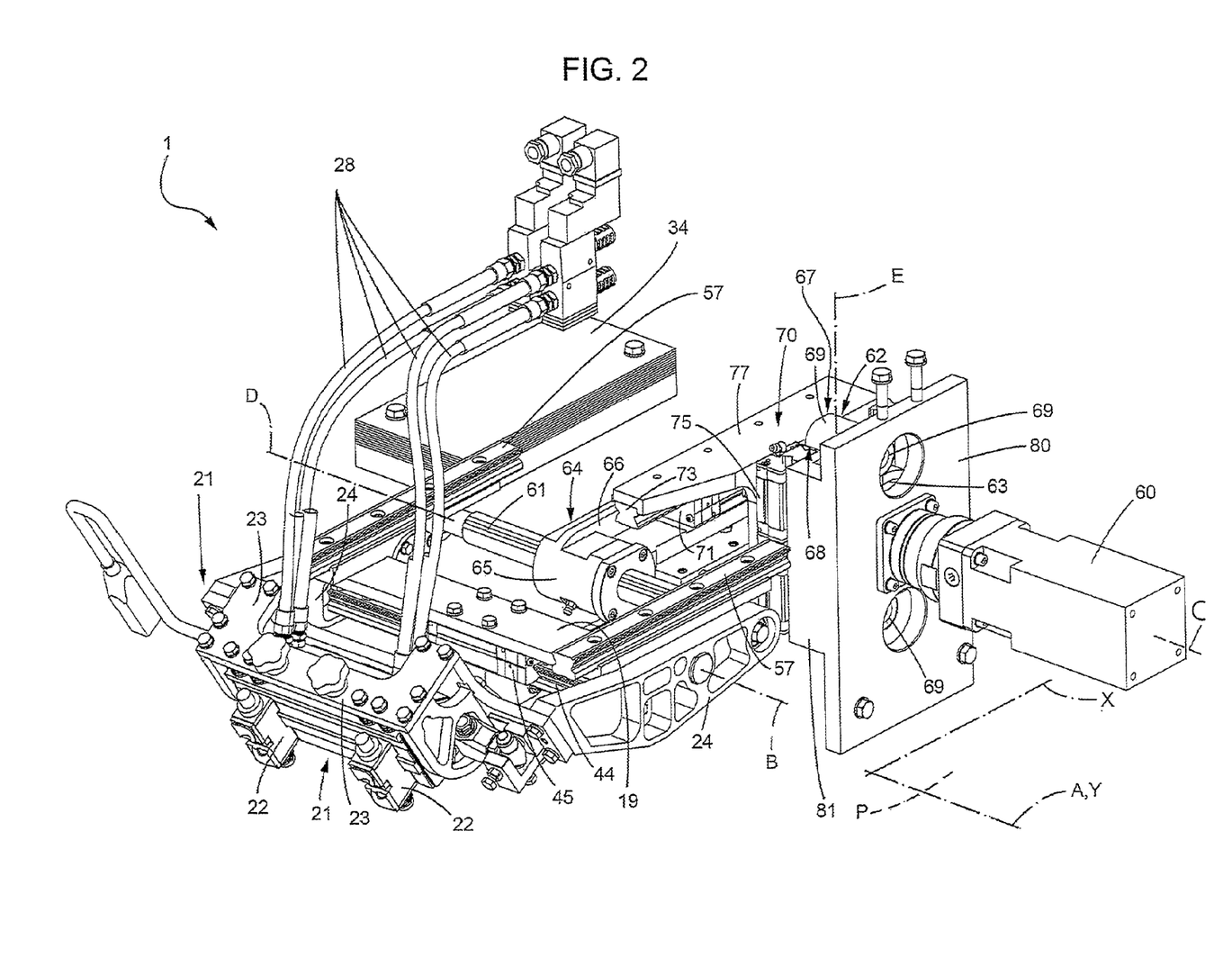
FIG. 2 shows a top view in perspective, with parts removed for clarity, of the FIG. 1 gluing unit.
Figure 3:
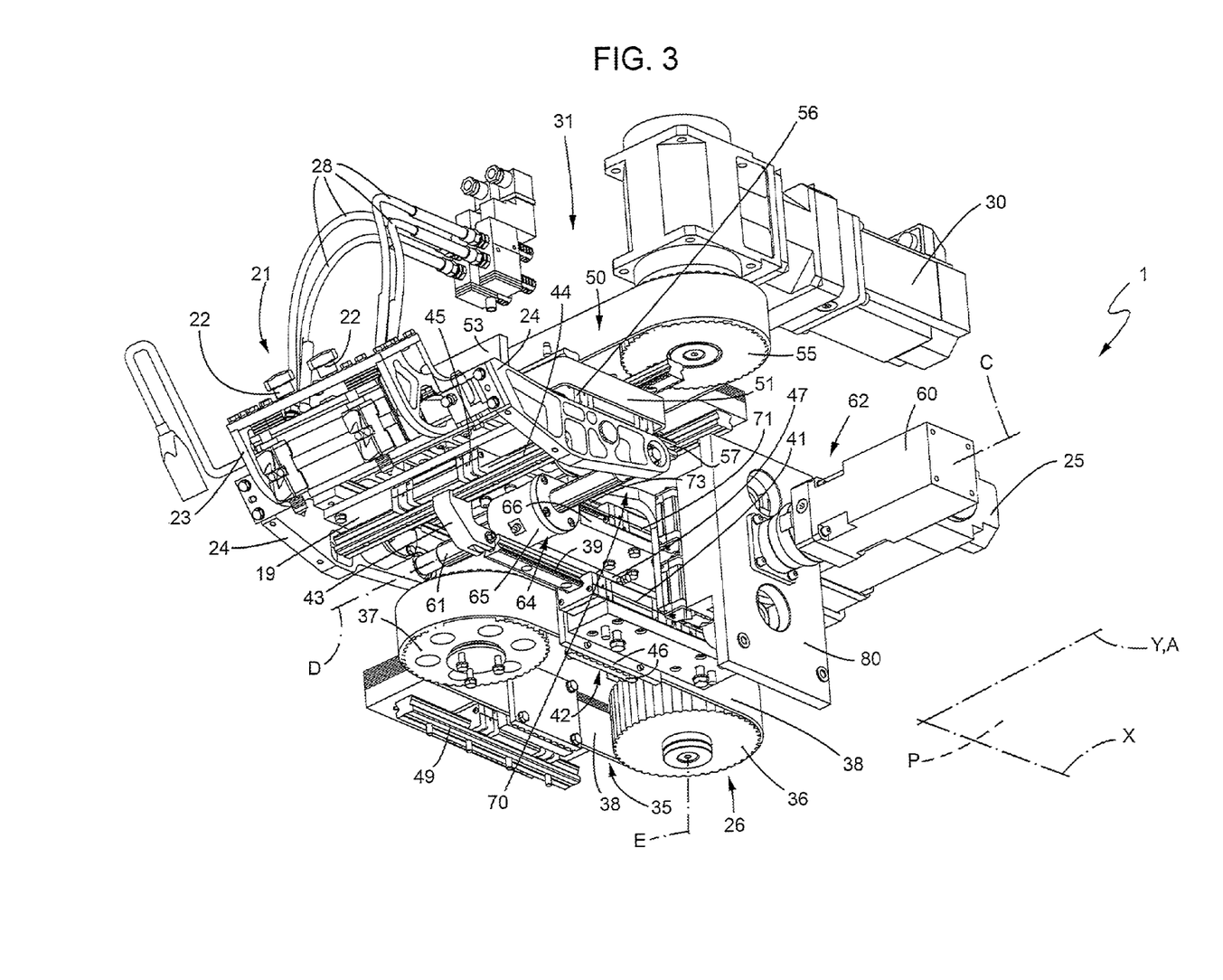
FIGS. 3 and 4 show underside views in perspective of the FIG. 1 gluing unit from different angles.
Figure 8:
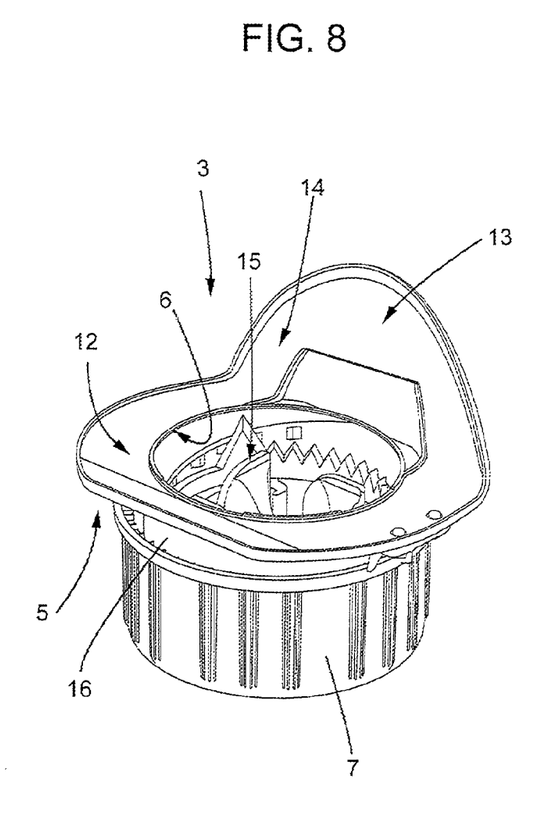
FIG. 8 shows a particular opening device to which adhesive can be applied by the FIG. 1-7 unit.
Figure 9:
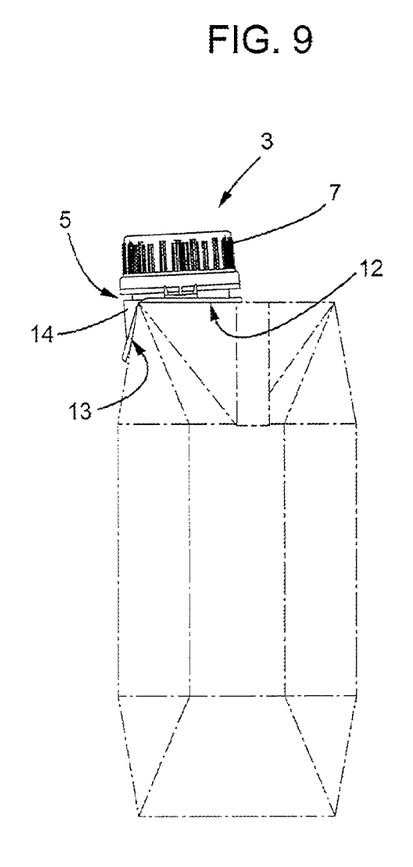
FIG. 9 shows the FIG. 8 opening device applied to a package at a station downstream from the FIG. 1-7 unit.

FIGS. 1, 8 and 9 show one example of an opening device 3, to which reference is made in the following description purely by way of a non-limiting example.

Opening Device 3 Substantially Comprises:
  a frame 5 which is applied about the removable portion of the package, and has a circular opening 6 through which the food product is poured;
  a removable screw cap 7 fitted to frame 5 to close opening 6; and
  a cutting member 15 (FIG. 8) which, in use, engages opening 6 and interacts with the removable portion of the package to partly detach the removable portion from the rest of the packaging material and so open the package.

Frame 5 straddles an edge between two adjacent walls of the package, e.g. a top wall and a top end portion of a lateral wall adjacent to the top wall (FIG. 9), and comprises two fastening portions 12, 13 at a predetermined angle to each other and fixed to the top wall and lateral wall of the package respectively.

More specifically, frame 5 comprises a flange 14 defining portions 12, 13; and a threaded collar 16 (FIG. 8) defining opening 6 and for receiving cap 7.

Portion 12 is substantially annular, and portion 13 projects from portion 12 on the opposite side to collar 16.

The angle between portions 12, 13 of flange 14, on the opposite side, in use, to the top wall and lateral wall of the package, is preferably 90° or over and less than 180°.

Collar 16 projects from flange 14 and, once opening device 3 is applied to the package, extends from the opposite side of flange 14 to the side facing the top wall and lateral wall of the package.

With reference to FIGS. 1 to 4, unit 1 substantially comprises:
  a conveyor (not shown) for feeding devices 3 along a straight path A from a known feed station (not shown) to a known output station (not shown);
  a bed 20; and
  an adhesive dispenser assembly 21 projecting outwards of bed 20 and comprising a number of—in the example shown, two—dispensers 22 which interact successively with each opening device 3 along path A to apply adhesive to portions 12, 13 of frame 5.

More specifically, dispenser assembly 21 comprises a supporting body 23, from which dispensers 22 project; two rocker arms 24 fixed to supporting body 23, on the opposite side to dispensers 22, and supported by bed 20; and a plate 19 interposed between and connected to rocker arms 24.

Dispensers 22 are movable in a direction Y parallel to path A, and in a direction X perpendicular to direction Y and defining with direction Y a horizontal plane parallel to path A.

Opening devices 3 are conveyed on the conveyor with respective portions 12 lying in plane P.

Dispensers 22 Preferably Slope with Respect to Plane P.

To move dispensers 22 in directions X, Y, unit 1 also comprises:
  a motor 25 connected functionally to plate 19 of dispenser assembly 21 by a transmission 26 to move dispensers 22 in direction X with respect to bed 20; and
  a motor 30 connected functionally to plate 19 of dispenser assembly 21 by a transmission 31 to move dispensers 22 in direction Y with respect to bed 20. Rocker arms 24 extend substantially in direction X, and are positioned facing a given distance apart in direction Y.

For each dispenser 22, dispenser assembly 21 comprises two adhesive feed lines 28.

Transmission 26 substantially comprises:
- an endless belt 35 looped about a pulley 36 driven by motor 25, and about a return pulley 37;
- a slide 39 which is connected by an L-shaped member 42 to a branch 38 of belt 35 parallel to direction X, and runs in direction X inside a fixed runner 41 elongated in direction X;
- a member 44 elongated in direction Y and having an outer profile connected to an end portion 43 of slide 39 so as to be moved in direction X by slide 39; and
- a member 45 secured to an underside surface of plate 19 and engaged by member 44 on the opposite side to plate 19.

More specifically, member 42 has two walls 46 fixed to opposite sides of branch 38 of belt 35; and a wall 47 fixed to the bottom of slide 39 and to walls 46.

Member 45 defines a cavity engaged by member 44, which has an outer profile complementary to the cavity of member 44.

Members 45, 44 are so connected that movement of member 44 parallel to direction X also moves member 45 and dispenser assembly 21 parallel to direction X, whereas member 44 is free to slide parallel to direction Y inside the cavity defined by member 45.

In the example shown, the cavity defined by member 45 and the outer profile of member 44 are dovetailed.

Similarly, slide 39 has an outer profile engaging and complementary to a seat defined by runner 41.

In the example shown, the outer profile of slide 39 and the seat defined by runner 41 are both dovetailed.

Unit 1 also comprises a counterweight 49 connected to the opposite branch of belt 35 to branch 38, and which balances the moving masses and reduces operating vibration of transmission 26.

Figure 7:
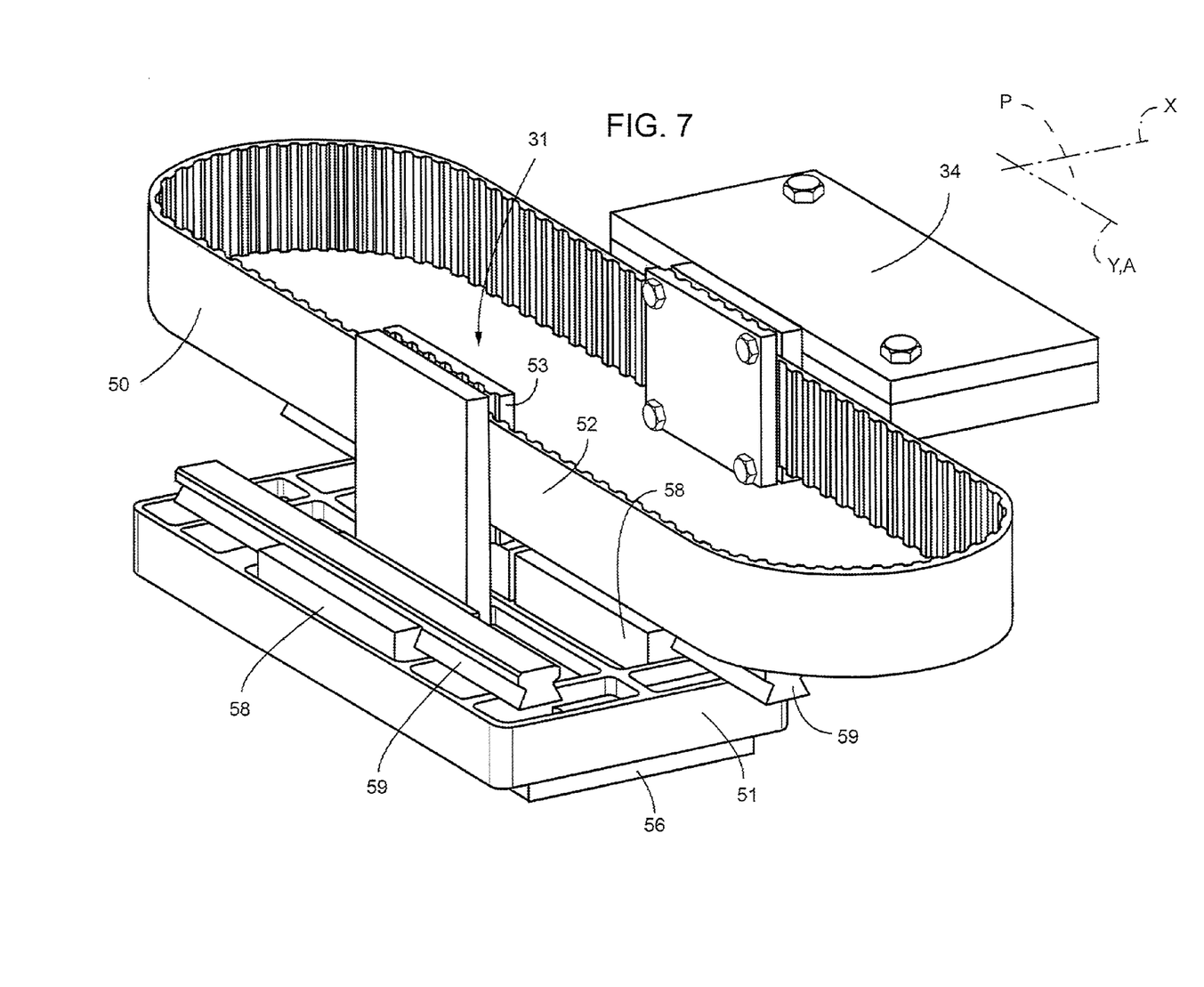
FIG. 7 shows a much larger-scale view in perspective of details of the FIG. 1-4 gluing unit.

Transmission 31 comprises (FIGS. 3, 4 and 7):
- an endless belt 50 looped about a pulley 55 driven by motor 30, and about a return pulley (not shown);
- a slide 51 which is connected to a branch 52, parallel to direction Y, of belt 50 by two members 53 located on opposite sides of branch 52, and is quadrangular in shape with two sides parallel to direction X and two sides parallel to direction Y;
- two members 56 elongated parallel to direction X and fitted to an underside surface of slide 51, on the opposite side to belt 50, so as to be moved parallel to direction Y by slide 51; and
- two members 57 (not visible in FIG. 7) fixed to a topside surface of plate 19, on the opposite side to member 45, and which are elongated parallel to direction X, and engaged by respective members 56.

More specifically, on the opposite side to members 56, slide 51 comprises two parallel members 58 elongated parallel to direction Y, and which run parallel to direction Y on two fixed runners 59 also elongated parallel to direction Y. Members 58 define respective dovetail cavities elongated parallel to direction Y and engaged by bottom portions of respective dovetail outer profiles defined by runners 59.

Members 56 and 57 are so connected that movement of members 56 parallel to direction Y also moves respective members 57 and dispenser assembly 21 parallel to direction Y, whereas members 57 are free to slide parallel to direction X inside respective members 56.

More specifically, members 56 define respective cavities elongated parallel to direction X and engaged by the outer profiles of respective members 57.

The outer profiles of members 57 are complementary in shape to the cavities defined by respective members 56.

In the example shown, the cavities of members 56 and the outer profiles of members 57 are dovetailed.

Transmission 31 also comprises a counterweight 34 connected to the opposite branch of belt 50 to branch 52, and which balances the moving masses and reduces operating vibration of transmission 31.

Dispensers 22 are advantageously movable crosswise to plane P.

Dispensers 22 thus travel along an application path comprising a first portion lying in plane P to apply adhesive to portion 12 of flange 14; and a second portion crosswise to plane P to apply adhesive to portion 13 of flange 14.

More specifically, rocker arms 24 of dispenser assembly 21 are hinged to plate 19 about an axis B parallel to and at a distance from path A, to allow dispensers 22 to tilt with respect to plane P.

To move dispenser assembly 21 crosswise to plane P, unit 1 comprises a motor 60 having an output member (not shown) rotating about an axis C parallel to direction Y; a pin 61 elongated along an axis D parallel to axis B, and to which rocker arms 24 are hinged about axis D; and a transmission 62 interposed between motor 60 and pin 61 to convert rotation of the output member of motor 60 about axis C to rotation of rocker arms 24 and therefore of supporting body 23 and dispensers 22 about axis B.

More specifically, motor 60 operates independently of motors 25, 30.

Axes B, C, D are parallel, spaced apart, perpendicular to direction X, and parallel to and spaced apart from path A and direction Y.

More specifically, axis D is interposed between axes B and C.

Transmission 62 substantially comprises:
- a cam 63 rotated by the output shaft of the motor along axis C;
- a member 64 defining, integrally, a portion 65 having a cylindrical seat, of axis D, engaged by pin 61; and an arm 66 projecting from portion 65 away from dispenser assembly 21 and parallel to direction X; and
- a cam follower 67 connected functionally to arm 66 of member 64 and to cam 63 to convert rotation of cam 63 about axis C to translation of member 64 and pin 61 along an axis E perpendicular to plane P, so as to rotate rocker arms 24 about axis D.

More specifically, pin 61 and portion 65 of member 64 are integral with each other as regards translation along axis E, whereas pin 61 is free to slide parallel to axis D inside the seat defined by portion 65.

In the example shown, pin 61 and the seat defined by portion 65 have respective mating splined profiles parallel to axis D.

Figure 5:
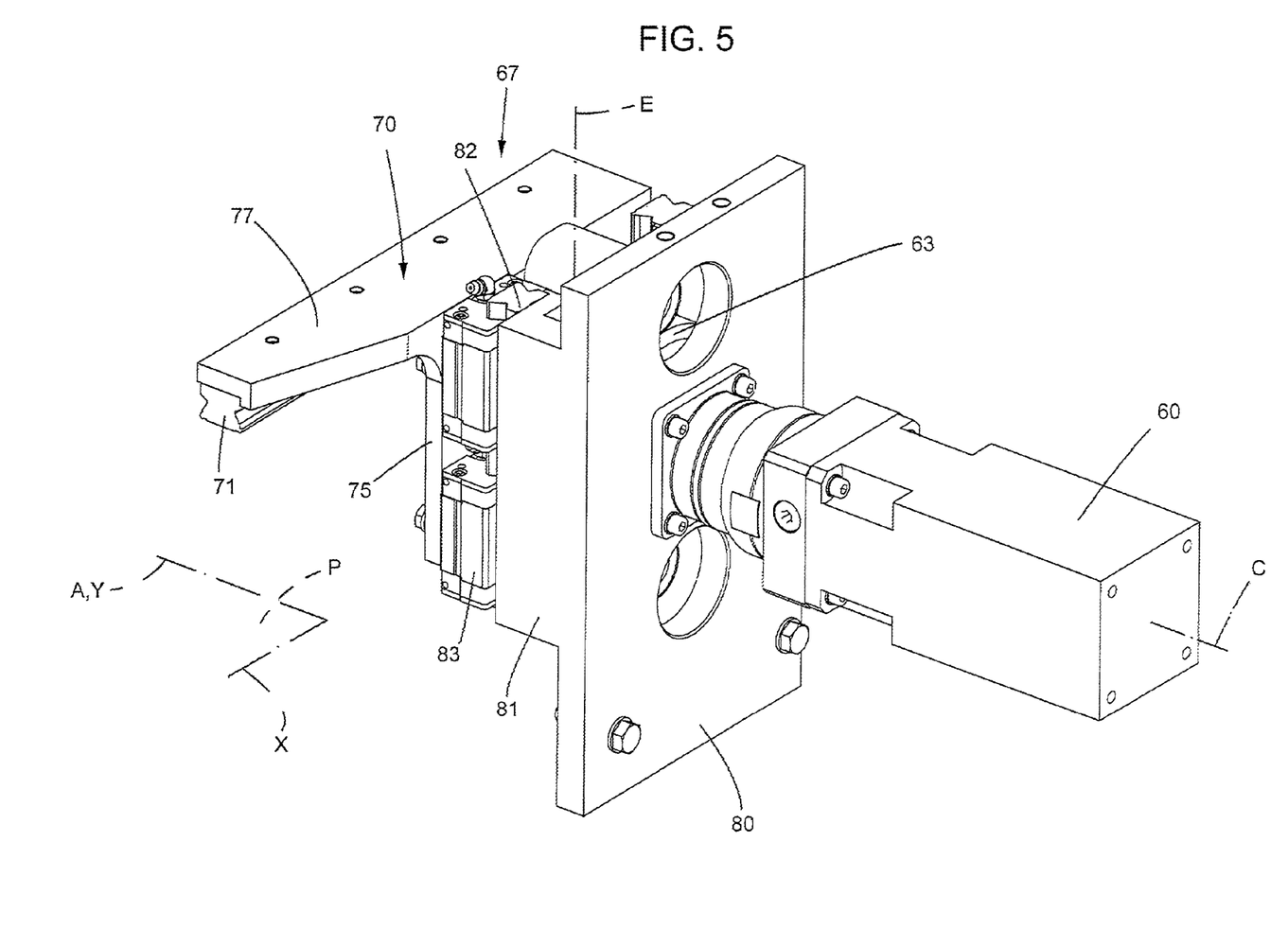
FIGS. 5 and 6 show larger-scale views in perspective of details of the FIG. 1-4 gluing unit from different angles.
Figure 6:
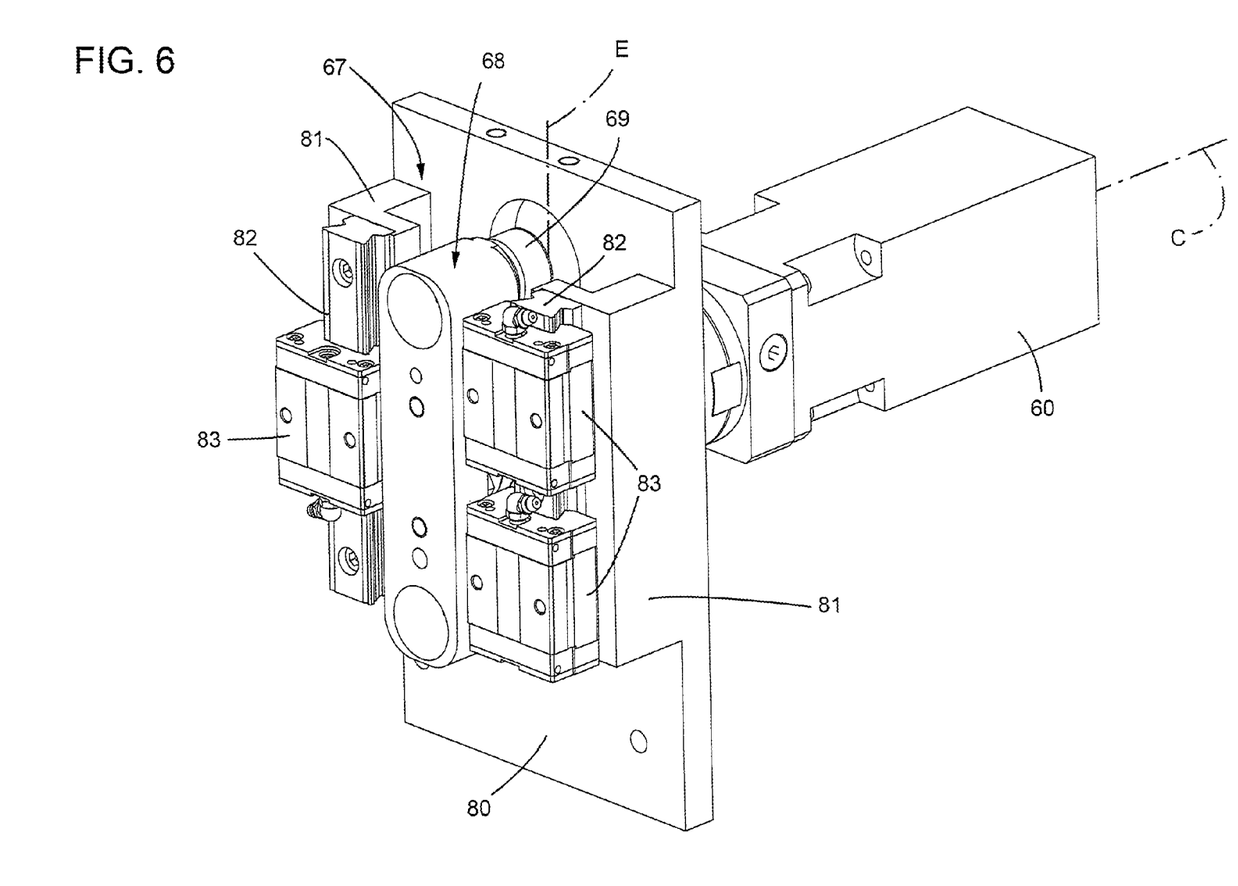

Cam follower 67 (FIGS. 5, 6) substantially comprises a member 68 elongated along axis E; and two rollers 69 defined by respective axial ends of member 68 and cooperating with cam 63.

The interaction between cam 63 and rollers 69 also moves cam follower 67 parallel to axis E.

Transmission 62 also comprises:
- a lever 70 defined by a plate 75 fixed to member 68, and by an arm 77 which projects from plate 75 towards dispenser assembly 21 and parallel to direction X, and is fixed to a surface of member 68 on the opposite side to cam 63;
- a slide 73 elongated substantially in direction X, and fixed to an underside surface of arm 77 facing arm 66 of member 64; and a runner 71 engaged by slide 73 and fixed to a topside surface of arm 66 facing lever 70.

More specifically, slide 73 engages runner 71 to slide parallel to direction X; whereas movement of slide 73 parallel to axis E moves runner 71 and therefore member 64 and pin 61 parallel to axis E.

In the example shown, runner 71 defines a dovetail cavity elongated parallel to direction X and engaged by slide 73; and slide 73 has a dovetail outer profile complementary in shape to the cavity of runner 71.

Transmission 62 comprises a plate 80 fitted through with the output member of motor 60 and supporting, on the opposite side to motor 60, two L-section projections 81 located on opposite sides of member 68.

Projections 81 comprise respective runners 82 elongated parallel to axis E and fitted with respective slides 83 fitted to a surface of plate 75 opposite motor 60.

More specifically, slides 83 slide along runners 82 parallel to axis E.

In the example shown, slides 83 define respective dovetail cavities parallel to axis E and engaged by respective runners 82, which in turn have dovetail outer profiles complementary in shape to the cavities of respective slides 83.

In actual use, opening devices 3 are fed along path A with portion 12 substantially coplanar with plane P, and portion 13 extending from portion 12 towards dispenser assembly 21.

When opening devices 3 are positioned beneath dispenser assembly 21, each dispenser 22 is moved, from a start position, parallel to path A at the same speed as a respective opening device 3.

As it moves parallel to path A, each dispenser 22 performs a work cycle comprising a step in which adhesive is dispensed onto portions 12 and 13 of respective opening device 3, and a step in which no adhesive is dispensed. More specifically, during the step in which adhesive is dispensed, and as it moves parallel to path A, each dispenser 22 is moved, with respect to respective opening device 3, along the application path.

Each dispenser 22 applies adhesive to portion 12 of respective opening device 3 as it travels along the first portion of the application path in plane P, and applies adhesive to portion 13 of respective opening device 3 as it travels along the second portion of the application path outside plane P.

More specifically, motor 25 and transmission 26 move dispenser assembly 21 in direction X, motor 30 and transmission 31 move dispenser assembly 21 in direction Y, and motor 60 and transmission 62 tilt dispenser assembly 21 with respect to axis B and plane P to allow dispensers 22 to travel along the second portion of the application path.

More specifically, motor 25 rotates pulley 36 to move branch 38 of belt 35 parallel to direction X.

The movement of branch 38 of belt 35 parallel to direction X moves member 42, slide 39, members 44, 45 and plate 19 parallel to direction X.

The above movement of plate 19 moves dispensers 22 parallel to direction X.

Vibration induced by operation of motor 25 and transmission 31 is balanced by counterweight 49.

Motor 30 rotates pulley 55 to move branch 52 of belt 50 parallel to direction Y.

The movement of branch 52 of belt 50 parallel to direction Y moves slide 51 by means of members 53.

Members 56 integral with slide 51, and members 57 fixed to plate 19 are drawn along parallel to direction Y by slide 51.

The movement of plate 19 moves dispensers 22 parallel to direction Y.

Vibration induced by operation of motor 30 and transmission 31 is balanced by counterweight 34.

Motor 60 rotates cam 63 about axis C; and cam 63 cooperates with rollers 69 to move member 68, lever 70, and slide 73 along axis E.

The movement of slide 73 along axis E moves runners 71, member 64, and pin 61.

The movement of pin 61 tilts rocker arms 24, plate 19, and dispensers 22 about axis B.

Figure 4:
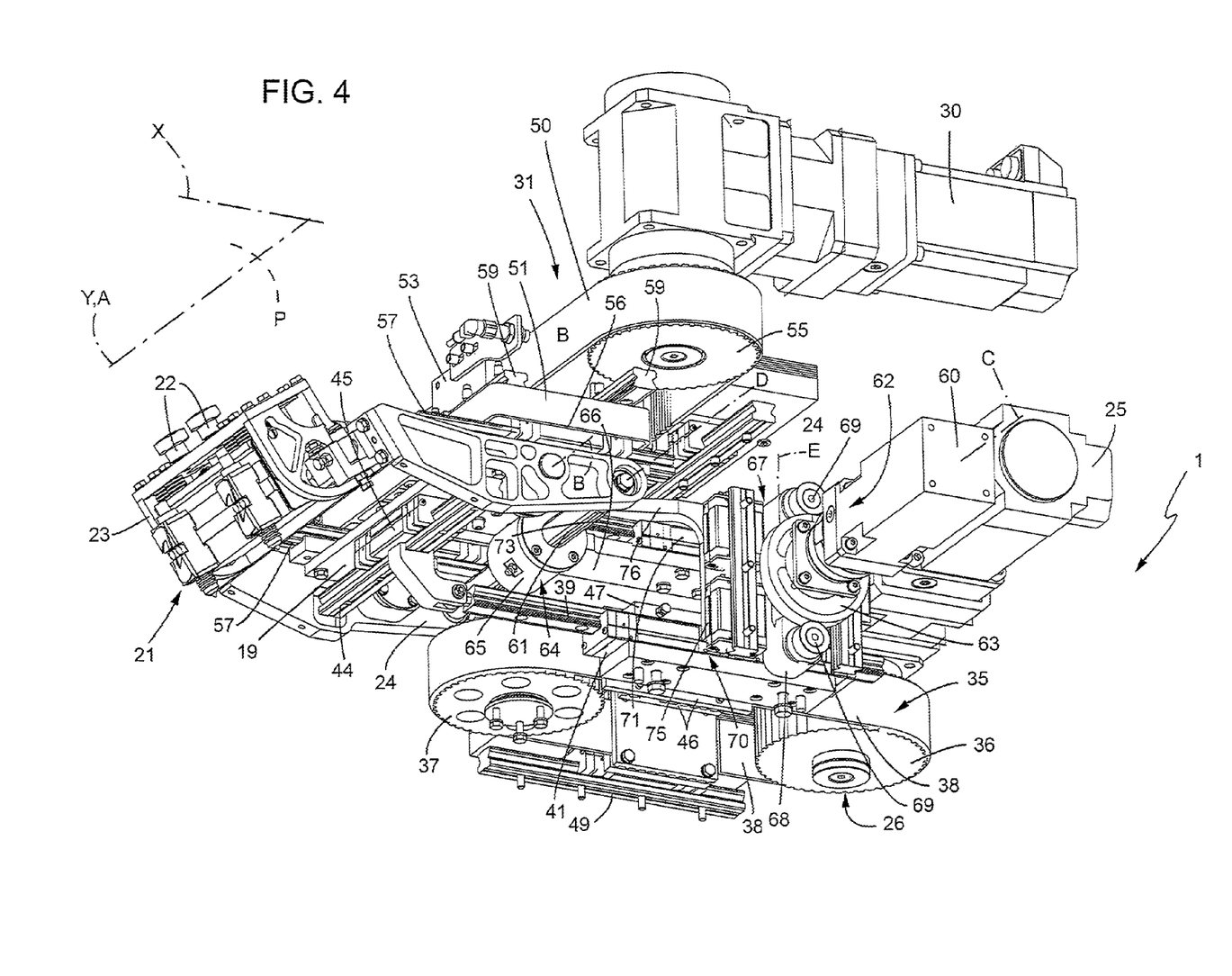

For example, when rollers 69 are raised with respect to axis C, rocker arms 24 and dispensers 22 rotate anticlockwise with respect to axis B in FIG. 4.

Conversely, when rollers 69 are lowered with respect to axis C, rocker arms 24 and dispensers 22 rotate clockwise with respect to axis in FIG. 4. Rotation of dispenser assembly 21 about axis B allows dispensers 22 to travel along the second portion of the application path to apply adhesive to portion 13 of flange 14 of respective opening devices 3.

As dispenser assembly 21 moves parallel to direction Y, pin 61 slides parallel to axis D with respect to portion 65 of member 64.

The advantages of unit 1 according to the present invention will be clear from the foregoing description.

In particular, unit 1 provides for moving dispensers 22 crosswise to plane P defined by directions X and Y.

As a result, the trajectories of dispensers 22 and the amount of adhesive applied to opening device 3 are controllable and repeatable much more accurately as compared with the known solutions described in the introduction.

Moreover, dispensers 22 being movable crosswise to plane P, unit 1 provides for applying adhesive quickly and controllably to both portions 12 and 13 of opening devices 3, by simply feeding opening devices 3 along path A, with no additional movements required.

Being tilted with respect to plane P, dispensers 22 can travel along the application path while remaining at substantially the same distance from portions 12, 13 of the opening devices to which adhesive is applied.

The Applicant has observed that this provides for an extremely even thickness of the adhesive applied to portions 12, 13, and greatly reduces the risk of breaks in the layer of adhesive applied to portions 12, 13.

Motor 60 being operated independently of motors 25 and 30, the application path is easily adjustable, thus greatly improving the versatility of unit 1. Clearly, changes may be made to unit 1 without, however, departing from the scope as defined in the accompanying Claims.

In particular, dispensing assembly 21 may comprise only one dispenser 22.

The invention claimed is:

1. A gluing unit configured to apply adhesive to a succession of opening devices to be fitted to respective sealed packages of food products pourable into a tube of packaging material, the gluing unit comprising:
a conveyor configured to convey the opening devices along a path;
an adhesive dispenser positioned along the path and movable in a plane parallel to the path, the adhesive dispenser being configured to apply an adhesive to a portion of the opening device;
a bed;
said adhesive dispenser being hinged to the bed and rotatable about a first axis parallel to the plane by at least one rocker arm so that the adhesive dispenser is tiltable relative to the plane, the adhesive dispenser being movable crosswise relative to the plane;
a drive member;

a transmission member interposed functionally between the drive member and the at least one rocker arm;

in use, the drive member and the transmission member rotate the at least one rocker arm and the adhesive dispenser about the first axis; and the transmission member comprising: (i) a cam connected functionally to the drive member and rotatable about a second axis; and (ii) a cam follower configured to cooperate with the cam and movable by the cam along a third axis crosswise to the first and second axes, the cam follower being connected functionally to the at least one rocker arm in a position spaced apart from the first axis.

2. The gluing unit of claim 1, wherein the transmission member comprises:

a pin extending along a fourth axis parallel to and spaced apart from the first axis, and movable angularly relative to the at least one rocker arm about the fourth axis; and a lever integral with the pin and the cam follower relative to the third axis.

3. The gluing unit of claim 2, wherein the transmission member comprises a runner integral with the pin along the third axis, and a slide fixed to the lever;

the slide being slidable, inside said runner, parallel to a direction crosswise to the path, and being fixed relative to the runner along the third axis.

4. The gluing unit of claim 3, wherein the transmission member comprises a member integral with the runner and connected to the pin in sliding manner in a direction parallel to the path, and in fixed manner relative to the third axis.

5. The gluing unit of claim 4, wherein the pin and a portion of the member connected to the pin possess respective splined profiles mating with each other and elongated along the fourth axis.

6. The gluing unit of claim 1, wherein the adhesive dispenser is tilted relative to the plane.

7. A gluing unit configured to apply adhesive to a plurality of opening devices conveyed along a path and fittable to respective sealed packages of food products pourable into a tube of packaging material, the gluing unit comprising:

an adhesive dispenser positioned along the path and configured to apply an adhesive to a portion of each of the opening devices, the adhesive dispenser being movable in a direction parallel to the path and in a direction crosswise to the path;

a rocker arm configured to rotate the adhesive dispenser about a first axis parallel to the path;

a motor configured to output rotational power; and a transmission member operatively connecting the motor and the rocker arm and configured to transmit rotational power from the motor to the rocker arm so that the rocker arm rotates the adhesive dispenser about the first axis, the transmission member comprising: (i) a cam operatively connected to the motor and rotatable about a second axis, and (ii) a cam follower operatively connected to the rocker arm and movable by the cam along a third axis crosswise to the first and second axes.

8. The gluing unit of claim 7, wherein the cam follower is connected to the rocker arm at a position offset from the first axis.

9. The gluing unit of claim 7, comprising a pin extending along a fourth axis parallel to and spaced apart from the first axis, and a lever operatively connected to the pin and the cam follower.

10. The gluing unit of claim 9, comprising a runner operatively connected to the pin and a slide fixed to the lever, the slide being slidable along the runner in a direction crosswise to the path and fixed relative to lever in a direction parallel to the third axis.

11. The gluing unit of claim 10, comprising a seat operatively connected to the runner and slidable along the pin in a direction parallel to the path.

12. The gluing unit of claim 11, wherein the seat and the pin possess mating splines.

* * * * *